April 14, 1925.  1,533,626
F. D. WILSON ET AL
TRANSMISSION DEVICE
Original Filed Jan. 2, 1923   2 Sheets-Sheet 1
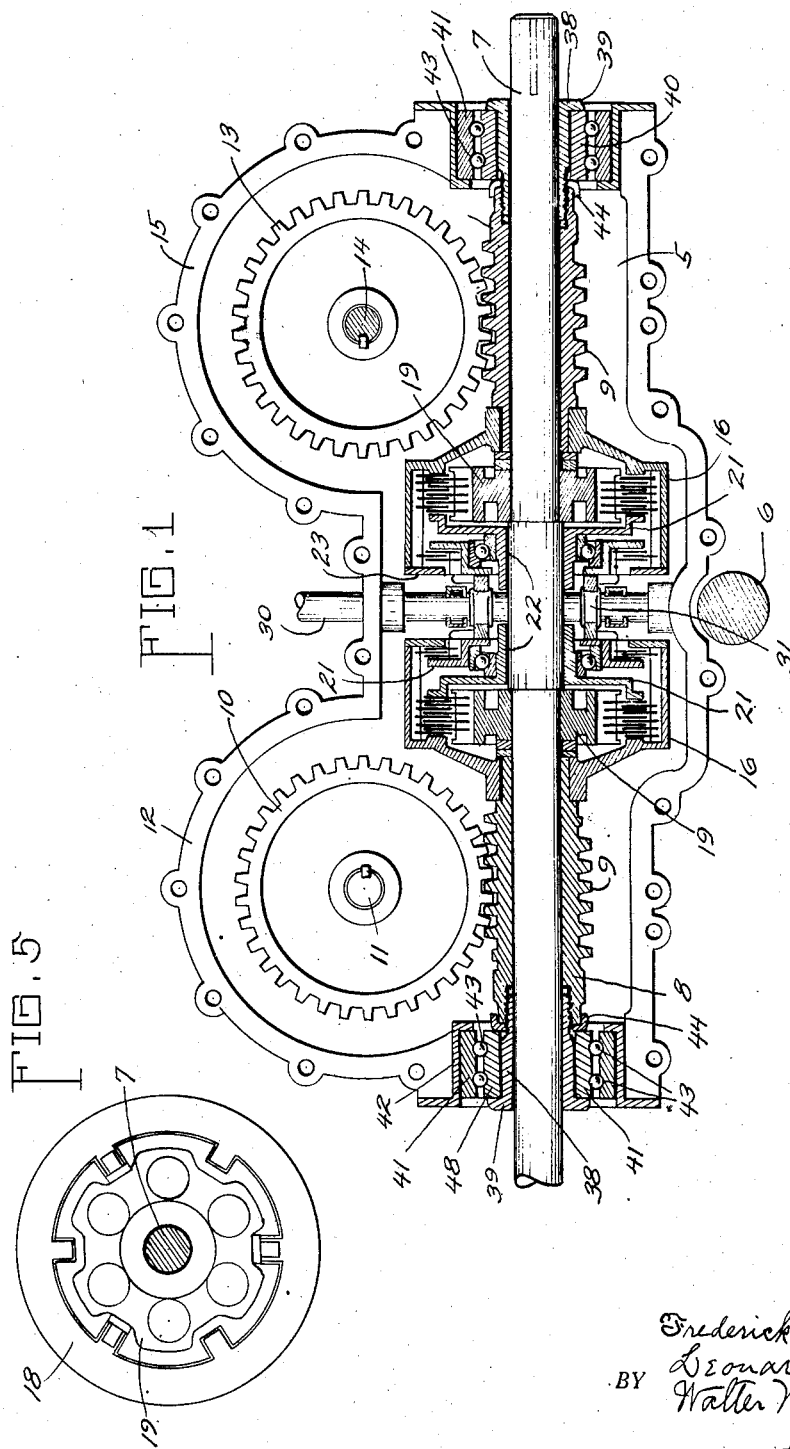
INVENTOR.
Frederick D. Wilson and
Leonard S. Burns,
BY Walter N. Haskell.
their ATTORNEY.

April 14, 1925.
F. D. WILSON ET AL
1,533,626
TRANSMISSION DEVICE
Original Filed Jan. 2, 1923   2 Sheets-Sheet 2
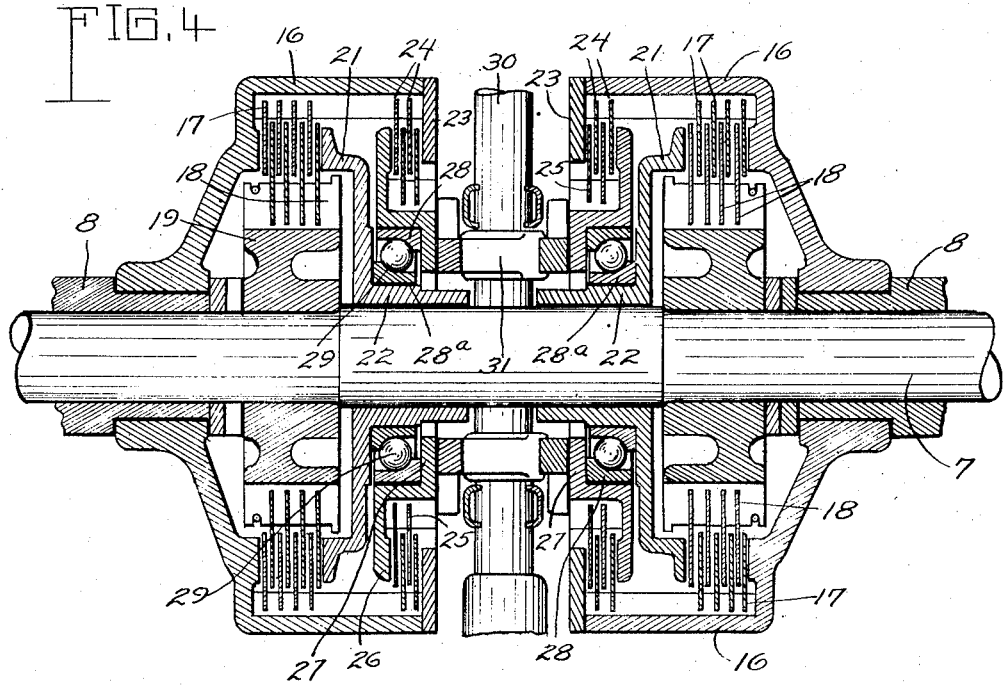
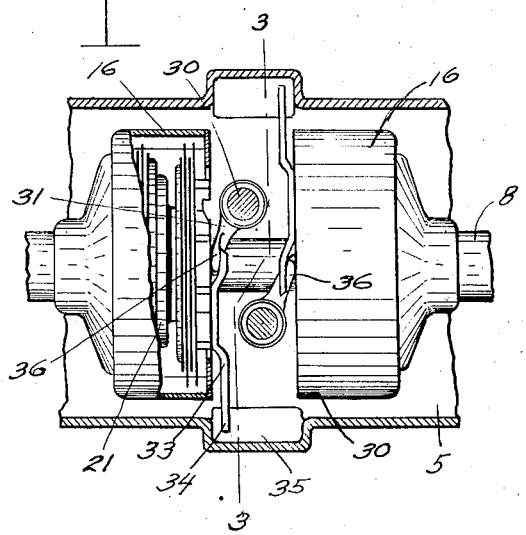
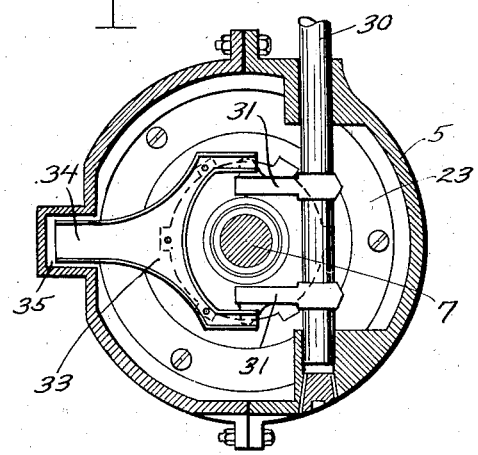
INVENTOR.
Frederick D. Wilson
and Leonard B. Burns,
BY Walter N. Haskell.
their ATTORNEY.

Patented Apr. 14, 1925.

1,533,626

UNITED STATES PATENT OFFICE.

FREDERICK D. WILSON AND LEONARD S. BURNS, OF HARVEY, ILLINOIS, ASSIGNORS, BY MESNE ASSIGNMENTS, TO AUSTIN MANUFACTURING CO., OF CHICAGO, ILLINOIS, A CORPORATION OF ILLINOIS.

TRANSMISSION DEVICE.

Application filed January 2, 1923, Serial No. 610,131. Renewed October 27, 1924.

*To all whom it may concern:*

Be it known that we, FREDERICK D. WILSON and LEONARD S. BURNS, citizens of the United States, residing at Harvey, in the county of Cook and State of Illinois, have invented certain new and useful Improvement in Transmission Devices, of which the following is a specification.

Our invention has reference to transmission devices, and pertains more specially to such devices as are designed for use in connection with tractor driving mechanism, such as has been shown and set forth in Letters Patent of the United States numbered 1,439,045, issued Dec. 19, 1922, to said Frederick D. Wilson. One of the purposes of said mechanism is to secure the joint operation of two sets of devices, such as the tread wheels on opposite sides of a tractor, and at the same time provide means for continuing the operation of one of said sets of devices, while interrupting the movement of the other one. This was accomplished in said former invention by means of worm-drive gearing, the pitch of the spirals on the worm-shafts being such as to cause an automatic stoppage of the parts associated therewith, upon said shafts being deprived of power. It has been found in practice, however, that there is a tendency of such worm-shafts to continue their movement for a time, caused partly by the momentum of the parts, and partly by the fluid friction induced by the oil in the casing in which such parts are enclosed. This continued movement is detrimental to the prompt action of the mechanism, such as changing the direction of a tractor at a desired point, but has a tendency to carry the machine past such point.

The chief purpose of the present invention is to provide means for instantly interrupting the movement of such worm-shafts, as soon as the power is removed therefrom. This is accomplished by means of clutch devices, which act as a brake on the worm-drive mechanism, as soon as the same has been released by the clutch members by means of which the worm-shaft is set in motion. This arrangement of clutch devices is under the same control as that by which the drive clutches are set, and is arranged so as to operate upon the reverse action of the mechanism for controlling the drive clutches.

The above named, and other features and advantages of the invention, will more fully appear from the following specification, reference being had to the accompanying drawings, in which:—

Fig. 1 shows the main part of the invention, in vertical longitudinal section.

Fig. 2 is a plan view of the clutch mechanism, with one of the clutch members broken away.

Fig. 3 is a vertical cross-section on the broken line 3—3 of Fig. 2.

Fig. 4 is an enlargement of the central part of Fig. 1.

Fig. 5 is an end view of the wheel 19.

The mechanism is shown enclosed in a casing 5, transversely of which is the rear axle 6 of the tractor with which the invention is embodied. Extending longitudinally of the casing 5 is a shaft 7, rotatably mounted, and fitted at one of its ends for connection with the main drive shaft of the tractor motor, so as to be operated thereby. Mounted on the shaft 7, near the ends thereof, so as to be nonrotatable therewith are sleeves 8, provided on their outer faces with worm-spirals 9, one of which is engageable with a worm-gear wheel 10, fixed on a shaft 11, which is journaled in a casing 12, forming an extension of the casing 5. The other sleeve 8 is similarly provided with a worm drive for engagement with a worm-gear wheel 13, on a shaft 14, journaled in a casing 15, also forming an extension of the casing 5. This part of the mechanism is substantially the same as that which is set forth in said former application, the purpose being to transmit power from the shaft 7 through the shafts 11 and 14 in opposite directions, to drive the tread wheels on opposite sides of the tractor, or for similar uses.

The movement of the shaft 7 is imparted to the worm-shafts 8 by similar groups of mechanism, and in the following description thereof only one of said groups will be referred to, the various parts being provided with corresponding reference numbers in the drawings. Fixed to the inner end of the sleeve 8 is a clutch-member 16, held in which is a series of friction disks 17, adapted for engagement with a similar series of disks 18, carried on the rim of a wheel 19, fixed on the shaft 7. A clutch-member 21 is supported on a sleeve 22, loosely mounted on the shaft 7. The last-named clutch-member is adapted to actuate the disks, so as to compress the same and lock the wheel 19 and member 16 together, causing a rotary movement of said wheel and the sleeve 8.

The clutch member 16 is provided at its edge with an annular flange 23, within which are supported friction disks 24, for engagement with similar disks 25 carried by a clutch member 26. Between the clutch members 21 and 26 is a circular space rectangular in cross-section, containing rings 28 and 28ª, grooved on their adjacent faces to form a ball race for a plurality of balls 29, which permit freedom of movement of one of said parts 21 and 26 with relation to the other. Supported vertically in the casing 5 is an operator's rod 30, to which is fixed a pair of arms 31, the ends of which have a bearing against the collar 27, on opposite sides of the shaft 7. The application of force to said arms operates to crowd the members 21 and 26 outwardly, resulting in the engagement of the disks 17 and 18, as before mentioned.

The clutch member 26 is held from rotation by means of a forked arm 33, secured to the collar 27, and provided with an extension 34, having lateral play in a boxing 35 projected outwardly from the casing 5. The inner ends of the forks of the arm 33 are bent outwardly, for engagement with lugs 36 on the ends of the arms 31. After the disks 17 and 18 have been engaged, in order to release the same the rod 30 is operated to move the arms 31 toward a central position, a continued movement thereof bringing the disks 25 into contact with the disks 24, which acts as a drag upon the member 16, causing the same to at once cease from rotating.

Each of the clutch mechanisms is provided with one of the operator's rods, and when both of said rods are actuated at the same time the shafts 11 and 14 are simultaneously driven. Upon the force of either of the rods 30 being withdrawn the shaft controlled by the other rod continues to rotate, while the release of the pressure of the first rod not only disengages the operating clutches, but throws the brake clutches into action, causing an instant stoppage of the worm-drive which is controlled thereby. The release of the pressure of the other rod 30 operates in the same way with the devices under the control thereof. In case it is desired to stop the mechanism quickly, this can be done by operating both of the rods at the same time, to free the active clutches, and apply the brake clutches. The application of the invention to the operation of a tractor, in the manner set forth in said former application, will be obvious. A proper manipulation of the controlling rods will cause the machine to turn abruptly to one side or other of a direct line, as desired.

Each of the worm-sleeves 8 is provided at its outer end with a special form of bearing, comprising a tubular member 38, rotatable on the shaft 7, and connected with the worm sleeve by means of a portion extending into a recess in the end of the sleeve, the connection between said parts being preferably of a threaded character. On the outer end of the member 38 is an annular flange 39, within which is held a ball-bearing member 40, encircled by a complementary member 41, which is held in a boxing 42 in the end of the casing 5. The adjacent faces of the parts 40 and 41 are grooved to form races for series of balls 43. By means of the threaded connection between the parts 8 and 38 a longitudinal adjustment of the extension may be secured. After the position of such extension has been established, it may be locked from displacement by means of a collar 44, slidable on the reduced portion of the extension, and rotatable therewith. A portion of the collar is bent at opposite edges thereof, so as to engage flattened end portions of the member 8. The collar 44 also bears against the inner end of the bearing 40, and prevents outward movement of the extension 38 and worm-gear member 8.

It will be evident that this is a very simple arrangement for supporting the outer ends of the worm-gears, and one wherein each of the worm devices is independent of the other, so that the end-thrust to which these devices are subject, when in action, will not be imparted from one thereof to the other. It is also obvious that this end-thrust is fully taken care of in the style of support for the worm-sleeve hereinabove set forth. In the mechanism shown, when both of the worm devices would be in operation, either forwardly or reverse, the line of thrust would be in the same direction, and the end-thrust in either direction is fully overcome by the bearings in the ends of the casing 5.

Another advantage of the worm-gear drive above mentioned is found in the comparatively short worm body, with a correspondingly reduced length of opening to be drilled therein, greatly facilitating the manufacture thereof.

What we claim, and desire to secure by Letters Patent, is:

1. A device of the class described, comprising a driven shaft, and shaft to be driven thereby; worm-drive mechanism operatively connected with said last-named shaft; a plurality of friction clutch elements adapted to cooperate to impart the movement of the first-named shaft to said worm-drive mechanism; a plurality of friction clutch elements capable of a brake action on said worm-drive mechanism; and means for actuating said first-named clutch elements, the reverse movement of such means operating to actuate said brake clutch elements.

2. In a transmission device, the combination with a driven shaft, and shaft to be driven thereby, of a worm-drive mechanism operatively connected with said last-named shaft; a clutch member carried by said first-named shaft, provided with friction clutch elements; a clutch-member carried by said worm-drive mechanism, and provided with friction clutch elements adapted for engagement with said first-named clutch elements; a brake clutch mechanism spaced apart from said clutch devices; a movable member interposed between said first-named clutch devices and said brake clutch mechanism, capable of alternately actuating the same, and means for operating said movable member.

3. In a device of the class described, the combination with a driven shaft, and shaft to be driven thereby; a clutch mechanism adapted to impart the movement of said first-named shaft to the last-named shaft; a clutch mechanism comprising a member carried by said first-named shaft, a member connected with said gear mechanism, and a plurality of friction clutch elements carried by said members, and adapted to cooperate with each other; means for suitably actuating said clutch elements; a secondary clutch mechanism, comprising a non-rotatable member in opposition to a portion of said gear-mechanism clutch member, and a plurality of friction clutch elements interposed between said members; said non-rotatable member being capable of movement to operate said last-named clutch elements, and interrupt the movement of said gear-mechanism; and means for simultaneously actuating the operating devices of the drive clutches and the brake clutches, to engage the first and release the second, or the reverse, as desired.

4. In a transmission mechanism, in combination with a driven shaft, and shaft to be driven thereby, a gear mechanism adapted to impart the movement of said driven shaft to the last-named shaft; a clutch mechanism adapted to impart the movement of the driven shaft to said gear mechanism, comprising a member rotatable with said shaft, a member connected with said gear mechanism, and a series of cooperating friction disks, carried partly by one of said members and partly by the other; an operating member, loosely mounted on said driven shaft and adapted to actuate said friction disks, to cause the engagement thereof; a brake-clutch mechanism in proximity to said first-named clutch mechanism, comprising a member having a ball-bearing relation with said operating member, and a plurality of friction disks interposed between said member and the gear mechanism clutch member, and engagable to intrrupt the movement of said last-named clutch member; and means for engagement with said brake-clutch member, to cause a simultaneous movement of said member and said operating member, to coincidently release the brake clutch and set the drive clutch or the reverse, as desired.

5. In a transmission mechanism, in combination with a drive-shaft and shaft to be driven thereby, a gear mechanism adapted to impart the movement of said drive-shaft to the last-named shaft; a drive-clutch mechanism including a plurality of friction disks; a brake-clutch mechanism including a plurality of friction disks; an operative member rotatable with the first-named clutch mechanism, and capable of causing the engagement of the disks thereof; an operative member having a slidable relation with the driven shaft and a non-frictional relation with said first-named operating member, adapted to cause an engagement of said brake-clutch disks; means for holding said last-named operating member from rotation; and means for imparting movement to said brake-clutch operating member, to cause a simultaneous action of said member and the drive-clutch operating member, to set the drive-clutch disks and release the brake-clutch disks, or the reverse, as desired.

6. In a transmission mechanism, the combination with a driven shaft and pair of shafts to be driven thereby, to transmit movement in opposite directions, worm-gear mechanism capable of imparting the movement of said driven shaft to said last-named shafts, independently of each other; drive-clutch mechanism between said driven shaft and worm-gear devices; brake-clutch mechanism in proximity to said drive-clutch mechanism and brake-clutch mechanisms, to cause a continued movement of either of said pairs of shafts and stoppage of the other one thereof, as desired.

In testimony whereof we affix our signatures.

FREDERICK D. WILSON.
LEONARD S. BURNS.